US009061595B2

(12) United States Patent
King et al.

(10) Patent No.: US 9,061,595 B2
(45) Date of Patent: Jun. 23, 2015

(54) AUXILIARY DRIVE APPARATUS AND METHOD OF MANUFACTURING SAME

(75) Inventors: Robert Dean King, Schenectady, NY (US); Gary Kilinski, Scotia, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 13/568,251

(22) Filed: Aug. 7, 2012

(65) Prior Publication Data
US 2012/0299378 A1    Nov. 29, 2012

Related U.S. Application Data

(62) Division of application No. 12/326,152, filed on Dec. 2, 2008, now Pat. No. 8,274,173.

(51) Int. Cl.
*B60L 1/00* (2006.01)
*B60L 11/18* (2006.01)
*H02M 3/158* (2006.01)

(52) U.S. Cl.
CPC .............. *B60L 11/1803* (2013.01); *B60L 1/00* (2013.01); *B60L 1/003* (2013.01); *B60L 2210/20* (2013.01); *H02M 3/1582* (2013.01);
(Continued)

(58) Field of Classification Search
CPC ......... B60R 16/03; B60L 1/00; H02M 3/1582
USPC .......................................................... 307/9.1
See application file for complete search history.

(56) References Cited

U.S. PATENT DOCUMENTS

| 5,373,195 A | 12/1994 | De Doncker et al. |
| 5,710,699 A | 1/1998 | King et al. |
| 5,903,449 A | 5/1999 | Garrigan et al. |

(Continued)

FOREIGN PATENT DOCUMENTS

| JP | 05-096928 A | 4/1993 |
| JP | 05-184180 A | 7/1993 |

(Continued)

OTHER PUBLICATIONS

Krishnamachari, B.; Czarkowski, D., "Bidirectional buck-boost converter with variable output voltage," Circuits and Systems, 1998. ISCAS '98. Proceedings of the 1998 IEEE International Symposium on , vol. 6, No., pp. 446,449 vol. 6, May 31-Jun. 3, 1998, doi: 10.1109/ISCAS.1998.705307.*

(Continued)

*Primary Examiner* — Daniel Cavallari
(74) *Attorney, Agent, or Firm* — Ziolkowski Patent Solutions; Jean K. Testa (57) ABSTRACT

An auxiliary drive circuit includes a first energy storage device coupled to a first DC bus and configured to output electrical power to the first DC bus, a first switch-mode power supply coupled to the first DC bus and to a second DC bus, the first switch-mode power supply configured to convert the electrical power to a first voltage and to output the first voltage to the second DC bus, and a second switch-mode power supply coupled to the second DC bus and coupled to an auxiliary bus, the second switch-mode power supply configured to convert the first voltage to a second voltage and to provide the second voltage to the auxiliary bus, the auxiliary bus configured to provide an auxiliary voltage to an auxiliary drive system, wherein the second voltage is different from the first voltage.

27 Claims, 10 Drawing Sheets

(52) U.S. Cl.
CPC ......... *H02M 3/1584* (2013.01); *Y02T 10/7005* (2013.01); *Y02T 10/725* (2013.01)

(56) References Cited

U.S. PATENT DOCUMENTS

| | | | |
|---|---|---|---|
| 6,331,365 B1 | 12/2001 | King | |
| 7,049,792 B2 | 5/2006 | King | |
| 7,392,143 B2* | 6/2008 | Jayabalan et al. | 702/60 |
| 7,438,984 B2* | 10/2008 | Aoyagi et al. | 429/430 |
| 7,923,866 B2 | 4/2011 | Ichikawa et al. | |
| 2001/0053950 A1 | 12/2001 | Hasegawa et al. | |
| 2002/0109406 A1 | 8/2002 | Aberle et al. | |
| 2003/0222502 A1* | 12/2003 | Takahashi et al. | 307/18 |
| 2004/0100149 A1 | 5/2004 | Lai | |
| 2004/0112320 A1 | 6/2004 | Bolz et al. | |
| 2006/0028778 A1 | 2/2006 | O'Gorman et al. | |
| 2006/0222910 A1* | 10/2006 | Aoyagi et al. | 429/12 |
| 2006/0224360 A1 | 10/2006 | Kishimoto | |
| 2009/0027930 A1 | 1/2009 | Usui | |
| 2009/0160248 A1* | 6/2009 | Ang | 307/9.1 |
| 2010/0078997 A1* | 4/2010 | Chen et al. | 307/31 |
| 2010/0141213 A1 | 6/2010 | Iida | |

FOREIGN PATENT DOCUMENTS

| | | |
|---|---|---|
| JP | 10-224912 A | 8/1998 |
| JP | 2006-278297 A | 10/2006 |
| JP | 2007-028803 A | 2/2007 |
| JP | 2007-302129 A | 11/2007 |
| JP | 2008-187884 A | 8/2008 |
| WO | WO 2008015863 A1 * | 2/2008 |
| WO | 2008081983 A1 | 7/2008 |

OTHER PUBLICATIONS

Daniel Nilsson, "DC Distribution Systems", 2005, Chalmers University of Technology, p. 6.*
JP Office Action dated Jul. 25, 2013 from corresponding JP Application No. 2009-273096.

* cited by examiner

AUXILIARY DRIVE APPARATUS AND METHOD OF MANUFACTURING SAME

CROSS-REFERENCE TO RELATED APPLICATION

The present application is a divisional of and claims priority to U.S. application Ser. No. 12/326,152 filed Dec. 2, 2008, the disclosure of which is incorporated herein.

BACKGROUND OF THE INVENTION

The invention relates generally to hybrid and electric vehicles, and more specifically to systems for operating auxiliary systems aboard hybrid and electric vehicles.

Purely electric vehicles typically use stored electrical energy to power an electric motor, which propels the vehicle. Hybrid electric vehicles combine an internal combustion engine and an electric motor that is typically powered by one or more electrical energy storage devices. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

In conventional vehicles, auxiliary systems include air conditioning, power steering pumps, oil pumps, coolant fans and air compressors, and the like, and are typically driven by belts and gear drives powered by the vehicle's internal combustion engine. However, electric and hybrid vehicles generally power auxiliary systems using stored or recaptured electrical energy. In some cases, for example, such as a transit bus operating in an urban area, energy required to operate auxiliary system loads may exceed the energy needed to propel the vehicle. Efficiency improvements in the operation of auxiliary systems may increase the driving range of electric vehicles and may reduce fuel usage and tail pipe emissions in hybrid vehicles.

Auxiliary systems in hybrid and electric vehicles may be powered directly from a battery, fuel cell, or other energy storage device, or may be powered through the traction drive DC link. One auxiliary system may run most efficiently at a voltage different from that needed for efficient operation of another auxiliary system. However, one common system design may cause the auxiliary systems to run at a voltage provided by the fuel cell or battery supplying power thereto even if the provided voltage is not ideal for a specific auxiliary system. Moreover, the voltage provided by such a battery or fuel cell may vary widely with the load placed thereon. As a result, some auxiliary systems may waste power by operating inefficiently at widely varying or suboptimal voltages. It would therefore be desirable to have a system capable of supplying stable power to a plurality of auxiliary systems at a voltage where each system operates most efficiently.

BRIEF DESCRIPTION OF THE INVENTION

According to an aspect of the invention, an auxiliary drive circuit including a first energy storage device coupled to a first DC bus and configured to output electrical power to the first DC bus, and a first DC-to-DC voltage converter coupled to the first DC bus and to a second DC bus, the first DC-to-DC voltage converter configured to convert the electrical power to a first voltage and to output the first voltage to the second DC bus. The auxiliary drive circuit also includes a second DC-to-DC voltage converter coupled to the second DC bus and coupled to an auxiliary bus, the second DC-to-DC voltage converter configured to convert the first voltage to a second voltage and to provide the second voltage to the auxiliary bus, the auxiliary bus configured to provide an auxiliary voltage to an auxiliary load, wherein the second voltage is different from the first voltage.

In accordance with another aspect of the invention, a method of manufacturing includes coupling a first energy storage device to a first DC link, the first energy device configured to output electrical power to the first DC link, coupling a first switch-mode power supply to the first DC link and to a second DC link, and configuring the first switch-mode power supply to convert the electrical power output by the first energy storage device to the first DC link into a first voltage, and to output the first voltage to the second DC link. The method also includes coupling a second switch-mode power supply to the second DC link and to an auxiliary bus, and configuring the second switch-mode power supply to convert the first voltage to a second voltage and to supply the second voltage to the auxiliary bus, wherein the second voltage is different from the first voltage.

According to yet another aspect of the invention, an auxiliary drive system including a first energy storage device coupled to a first DC bus, the first energy storage device configured to output electrical power to the first DC bus, a first bi-directional buck/boost converter coupled to a second DC bus and to the first DC bus, the first bi-directional buck/boost converter configured to output a first voltage to the second DC bus, a voltage converter coupled between an auxiliary bus and the second DC bus, the voltage converter configured to convert the first voltage to a second voltage different from the first voltage, the second voltage output to the auxiliary bus. The auxiliary drive system further includes an auxiliary system coupled to the auxiliary bus, and configured to receive an input voltage from the auxiliary bus, and a controller configured to regulate the first voltage output from the first bi-directional buck/boost converter, and further configured to regulate the second voltage output from the voltage converter.

Various other features and advantages will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION

The invention includes embodiments that relate to hybrid and electric vehicles. The invention includes embodiments that relate to an auxiliary drive apparatus and to methods for manufacturing auxiliary drive systems.

Figure 1:
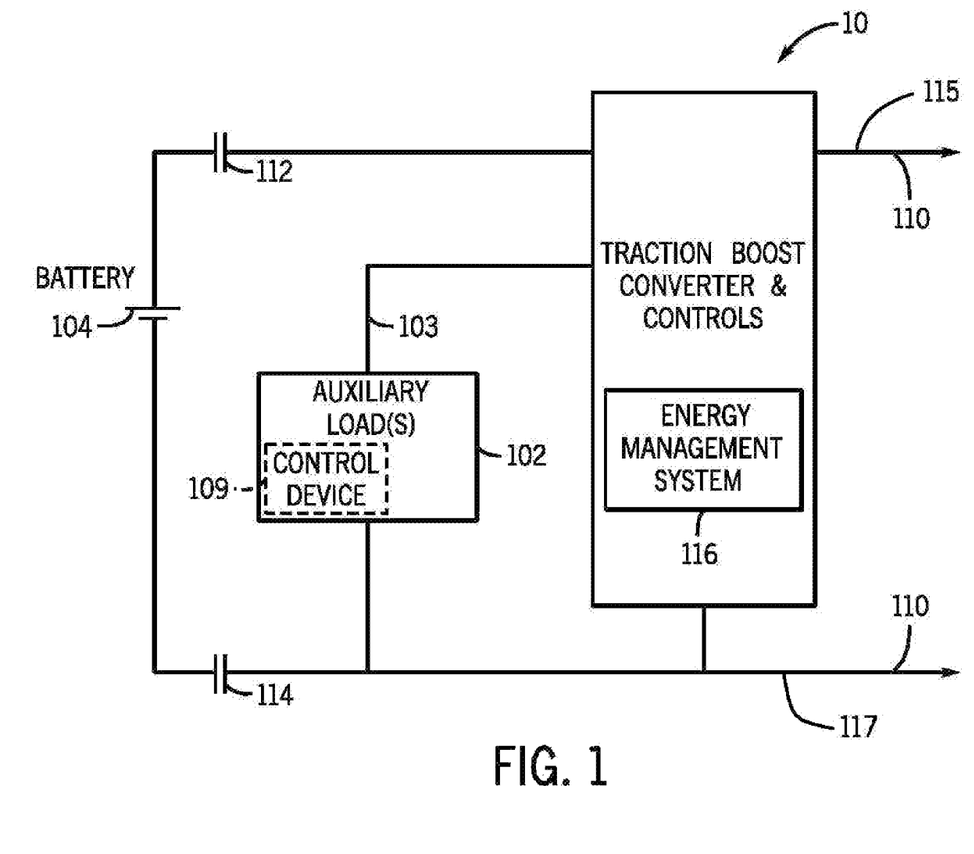
FIG. 1 is a schematic diagram of an auxiliary drive circuit according to an embodiment of the invention.
Figure 2:
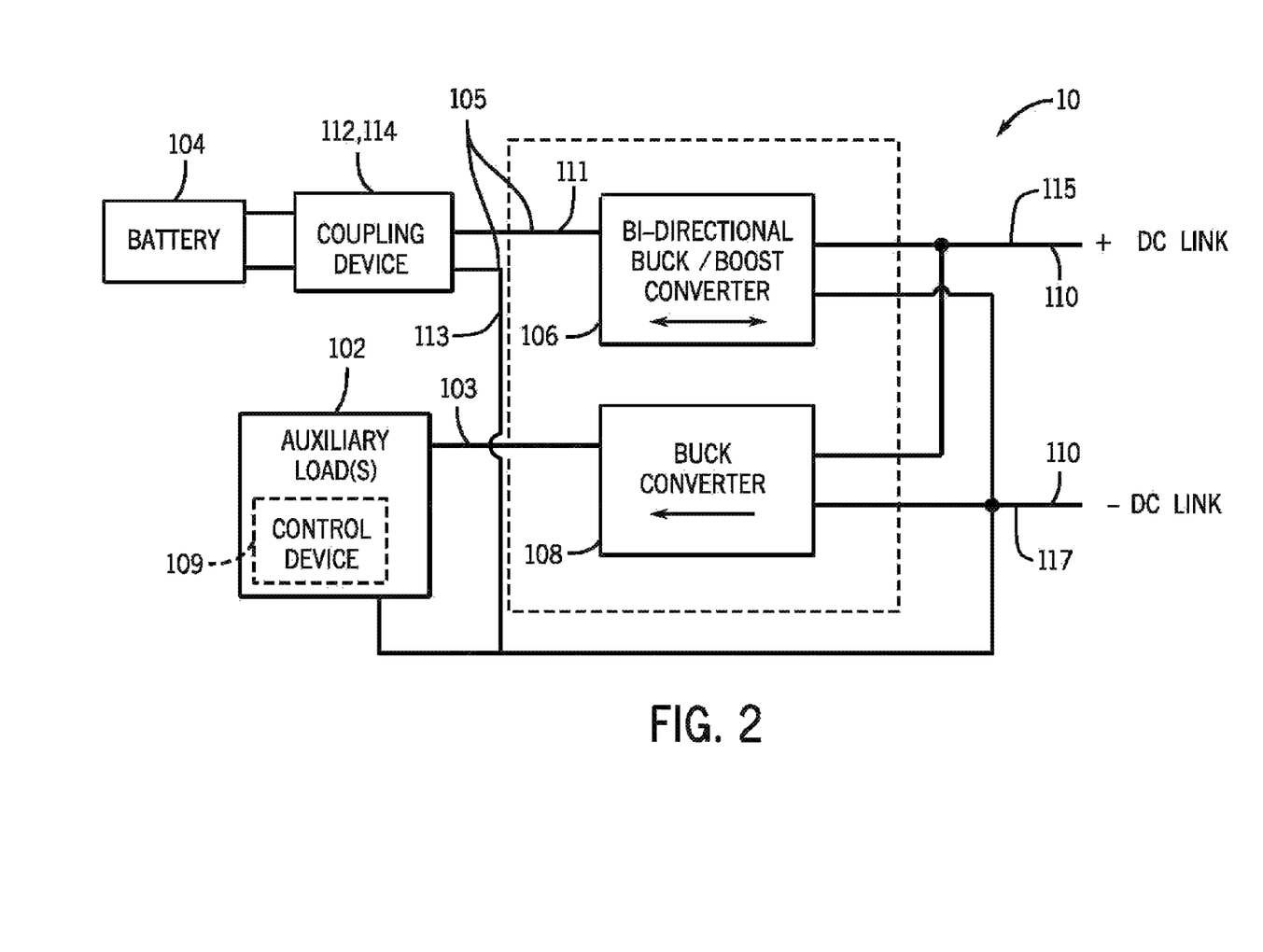
FIG. 2 is a schematic diagram of an auxiliary drive circuit according to an embodiment of the invention.

An embodiment of the invention illustrated in FIGS. 1 and 2 illustrates an auxiliary drive circuit 10 that includes an auxiliary system or load 102 coupled to an auxiliary link or auxiliary bus positive bus 103. The auxiliary load 102 is powered by a battery 104 coupled to a first DC link or bus 105, having a positive DC link 111 and a negative DC link 113. Battery 104 is coupled to first DC bus 105. In an alternate embodiment, battery 104 may be replaced by a fuel cell. A first bi-directional buck/boost converter 106 is coupled between first DC bus 105, which is a low-voltage side of the converter 106, and a second DC link or bus 110 which is a high-voltage side of the converter 106, having a positive DC link 115 and negative DC link 117. First bi-directional buck/boost converter 106 converts the electrical power that is coupled on the low-voltage side from battery 104 onto first DC bus 105 to a first voltage and outputs the first voltage to second DC bus 110. A buck converter 108 has a high-voltage side coupled to second DC bus 110, and a low-voltage side coupled to auxiliary bus 103. Buck converter 108 converts the first voltage on the high-voltage side, coupled to second DC bus 110, to a second voltage on the low-voltage side and outputs the second voltage to auxiliary bus 103 which supplies the second voltage to auxiliary load 102.

First DC bus 105 includes contactors 112, 114 to permit galvanic isolation of battery 104 from the remainder of circuit 10. In one embodiment, a double pole single throw (DPST) switch may be implemented with contactors 112, 114 to facilitate isolation of battery 104. In an alternate embodiment, contactors 112 and 114 may be replaced by semiconductor switches or similar devices capable of coupling and decoupling battery 104 to circuit 10. Semiconductor switches or similar devices are capable of decoupling a source from a load with very high impedance, typically measured in at least tens of megohms. Contactors 112, 114 could also be replaced by diodes in another embodiment of the invention. In operation, while power flows out of the battery, bi-directional buck/boost converter 106 boosts or steps up the voltage from battery 104 to a higher voltage that is output to second DC bus 110. Buck converter 108 takes the voltage output by bi-directional buck/boost converter 106 and, typically, steps down the voltage to a level where auxiliary load 102 can operate more efficiently. Auxiliary system 102 voltage is decoupled from second DC bus 110 by buck converter 108 and can be operated at a selected voltage below the second DC bus 110 voltage. Additionally, if there are multiple auxiliary loads 102, each load 102 may have a control device 109 (shown in phantom and described in detail in FIG. 11), such as a DC-to-AC inverter or DC-to-DC converter, configured to further adjust the input voltage to a level most suitable for the individual load.

Figure 3:
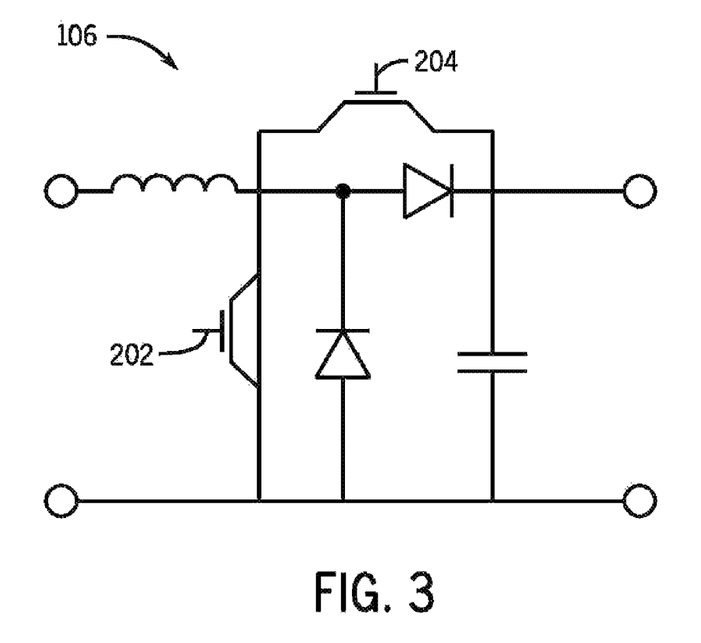
FIG. 3 is a schematic diagram of an exemplary bi-directional buck/boost converter according to an embodiment of the invention.
Figure 4:
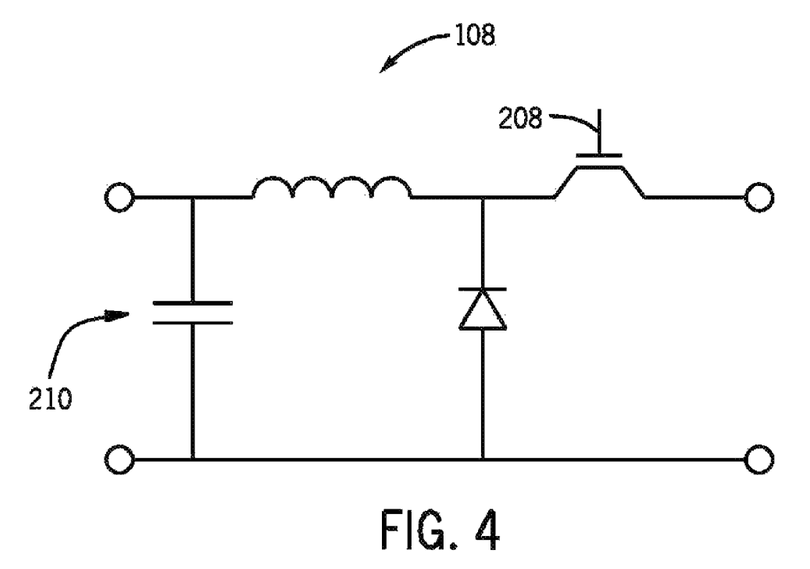
FIG. 4 is a schematic diagram of an exemplary buck converter according to an embodiment of the invention.

The level to which the battery 104 voltage (i.e., the voltage on the first DC bus) is stepped up by bi-directional buck/boost converter 106 depends on the manner in which the converter 106 is controlled. Similarly, the level to which the bi-directional buck/boost converter high-voltage side (i.e., the voltage on the second DC bus 110) is stepped down by buck converter 108 depends on the manner in which buck converter 108 is controlled. FIG. 3 shows an embodiment of a switch-mode power supply: a bi-directional buck/boost converter 106 having two transistors or switches 202, 204 used to control the voltage difference between the low-voltage side and the high-voltage side of the device. In an embodiment of the invention, a microprocessor-based energy management system (EMS), or controller, 116 (shown in FIG. 1) opens and closes switches 202, 204 using pulse-width modulation (PWM) to generate the desired output voltage. Similarly, a second switch-mode power supply, such as buck converter 108 shown in FIG. 4 has a voltage at the low-voltage side 210 that can be controlled by a switching of transistor 208 by EMS/controller 116 (shown in FIG. 1) using PWM. Pulse-width modulation of a power source, such as battery 104 and bi-directional buck/boost converter 106 or buck converter 108, involves modulation of the power source duty cycle. The resulting output is a series of square waves. By controlling the timing of the square waves, the power source output signal can be made to simulate a range of DC voltage values.

Microprocessor-based EMS/controller 116 is configured to optimize the operating efficiency of auxiliary load 102 by dynamically setting the auxiliary load control device input voltage based on a set of external factors. EMS 116 can communicate with the auxiliary load control device 109 to command the voltage, if the auxiliary load is a DC auxiliary load, or both voltage and frequency, if the auxiliary load is an AC auxiliary load, for auxiliary system 102 during vehicle operation. EMS 116 may communicate with the auxiliary load control device 109 to command the frequency and voltage of the specific motors that drive the auxiliary systems using measured values including, but not limited to, ambient temperature, coolant temperature, traction drive power and torque levels, vehicle speed, vehicle acceleration/deceleration rate, vehicle operating mode, and road gradient.

Figure 5:
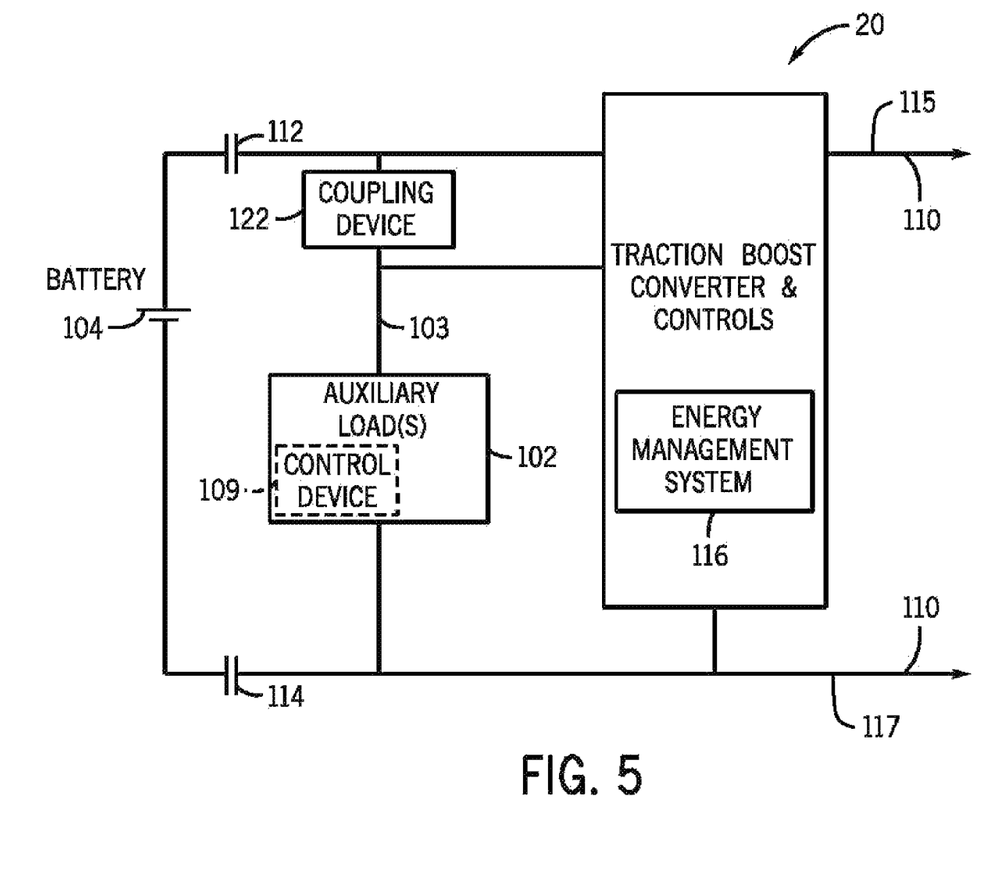
FIG. 5 is a schematic diagram of an auxiliary drive circuit according to an embodiment of the invention.
Figure 6:
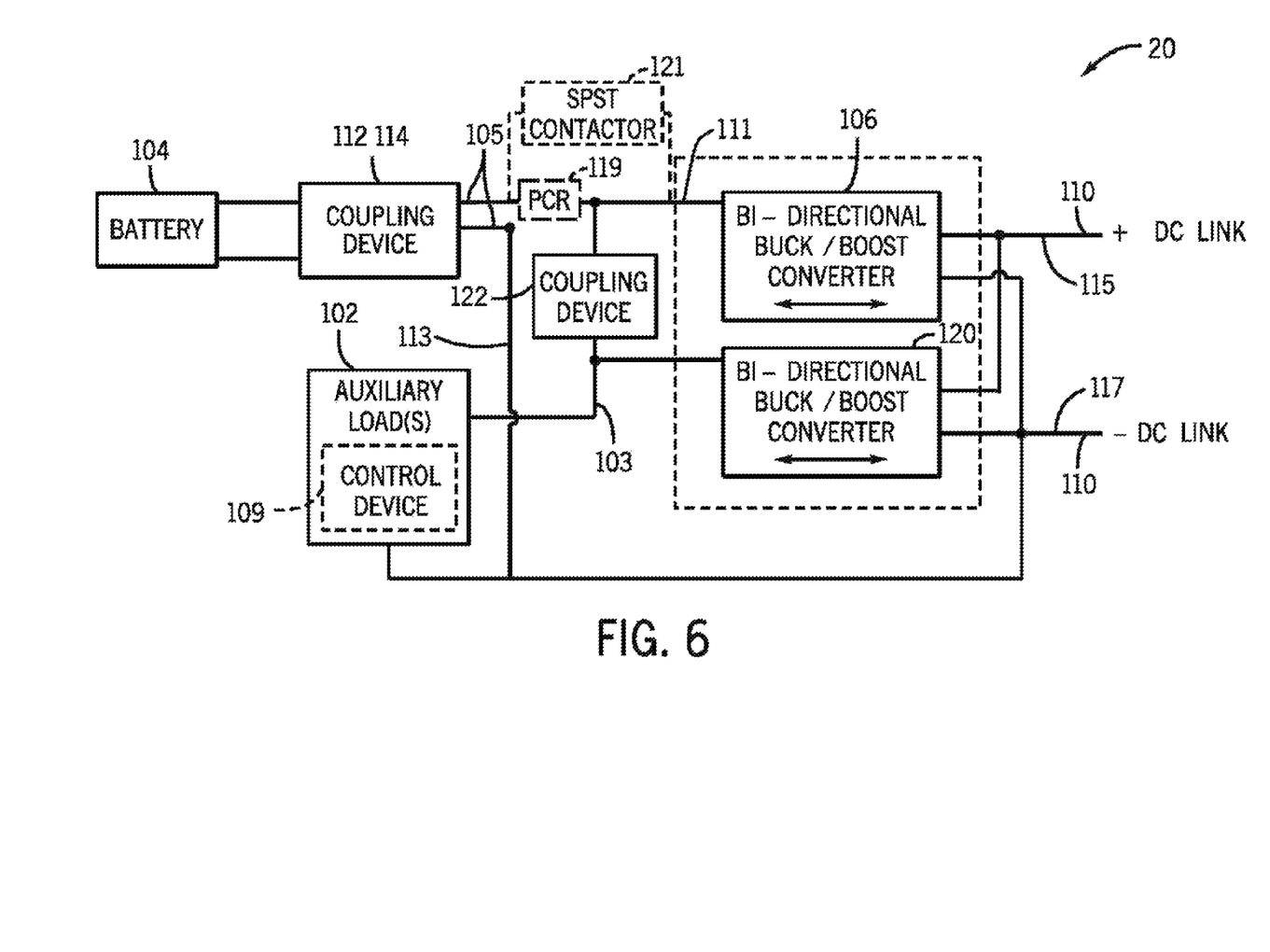
FIG. 6 is a schematic diagram of an auxiliary drive circuit according to an embodiment of the invention.

The auxiliary drive circuit 20 illustrated in FIGS. 5 and 6 is based on the circuit 10 of FIGS. 1 and 2 and replaces the buck converter 108 (in FIG. 2) by a second bi-directional buck/boost converter 120 and includes a coupling device 122 coupled between the positive DC Link 111 of first DC bus 105 and auxiliary bus positive bus 103. An alternate embodiment of circuit 20 includes a pre-charge resistor 119 and a single pole single throw (SPST) contactor 121 (shown in phantom) connected in parallel. Pre-charge resistor 119 and SPST contactor 121 are coupled between contactor 112 and first bi-directional buck/boost converter 106. In an alternate embodiment, a pre-charge configuration (not shown) couples a pre-charge resistor such as pre-charge resistor 119 and an SPST contactor such as SPST contactor 121, or appropriate semiconductor switch, in series wherein both of these series connected components 119, 121 are coupled in parallel with contactor 112. Coupling device 122 may be one of a diode, contactor, or semiconductor switch. Second bi-directional buck/boost converter 120 decouples auxiliary system 102 voltage from second DC bus 110 and is configured to convert a first voltage from second DC bus 110 into a second voltage that is output to auxiliary bus 103. The conversion generates an auxiliary bus 103 voltage that is less than the second DC bus 110 voltage. However, if auxiliary system 102 can operate efficiently at the battery 104 voltage, the system 102 can be powered directly from battery 104 through coupling device 122, thus bypassing the second bi-directional buck/boost converter 120, which receives power from battery 104 voltage via second DC bus 110, and bypassing first bi-directional buck/ boost converter 106. A pre-charge circuit (not shown) may be employed during start up of auxiliary loads, auxiliary control devices, and bi-directional buck/boost converters. As in the embodiment of FIGS. 1 and 2 described above, battery 104 can be replaced by a fuel cell in an alternate embodiment of the invention. Alternate embodiments are envisioned in which first and second bi-directional buck/boost converters 106, 120 simultaneously supply power to second DC bus 110, effectively doubling the power available to devices powered therefrom.

The ability to control the voltage output of first and second bi-directional buck/boost converters 106, 120 (and buck converter 108 in FIG. 2) enables the system 20 to power auxiliary load 102 directly from energy captured during regenerative braking During regenerative braking, battery 104 may not have to supply any power to the auxiliary system 102, further improving system efficiency. Additionally, it is possible that the voltage generated during regenerative braking may exceed the battery 104 voltage, and could be used to provide power to partially charge battery 104 and to operate auxiliary system 102. During severe braking or while holding speed on a downhill grade, the typically increased voltage from regenerative braking may increase the second DC bus 110 voltage to a level greater than the maximum allowable voltage of battery 104. Thus the voltage on auxiliary bus 103 may be greater than the voltage on first DC bus 105, allowing operation of cooling fans at higher speeds than when operated from battery 104 DC via first DC bus 105. As a result, fans provide additional cooling using regenerative braking energy without taxing battery 104. In addition, during severe regenerative braking events, when the auxiliary DC bus 103 is operated at a higher voltage than the voltage output by battery 104, additional regenerative energy is utilized and therefore less regenerative braking energy is wasted in dynamic brake grids (not shown), or dissipated in a mechanical brake or other power dissipating device (not shown).

Figure 7:
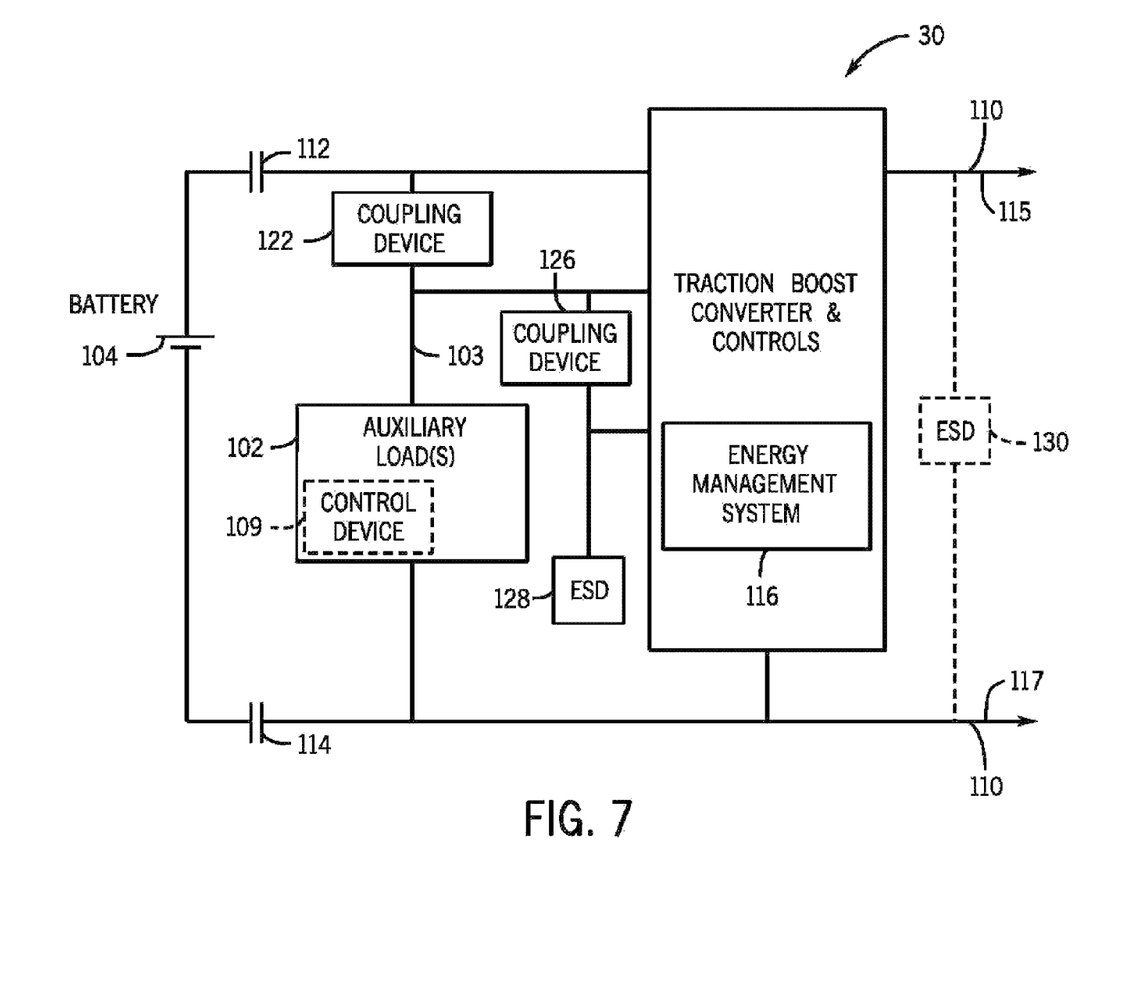
FIG. 7 is a schematic diagram of an auxiliary drive circuit according to an embodiment of the invention.
Figure 8:
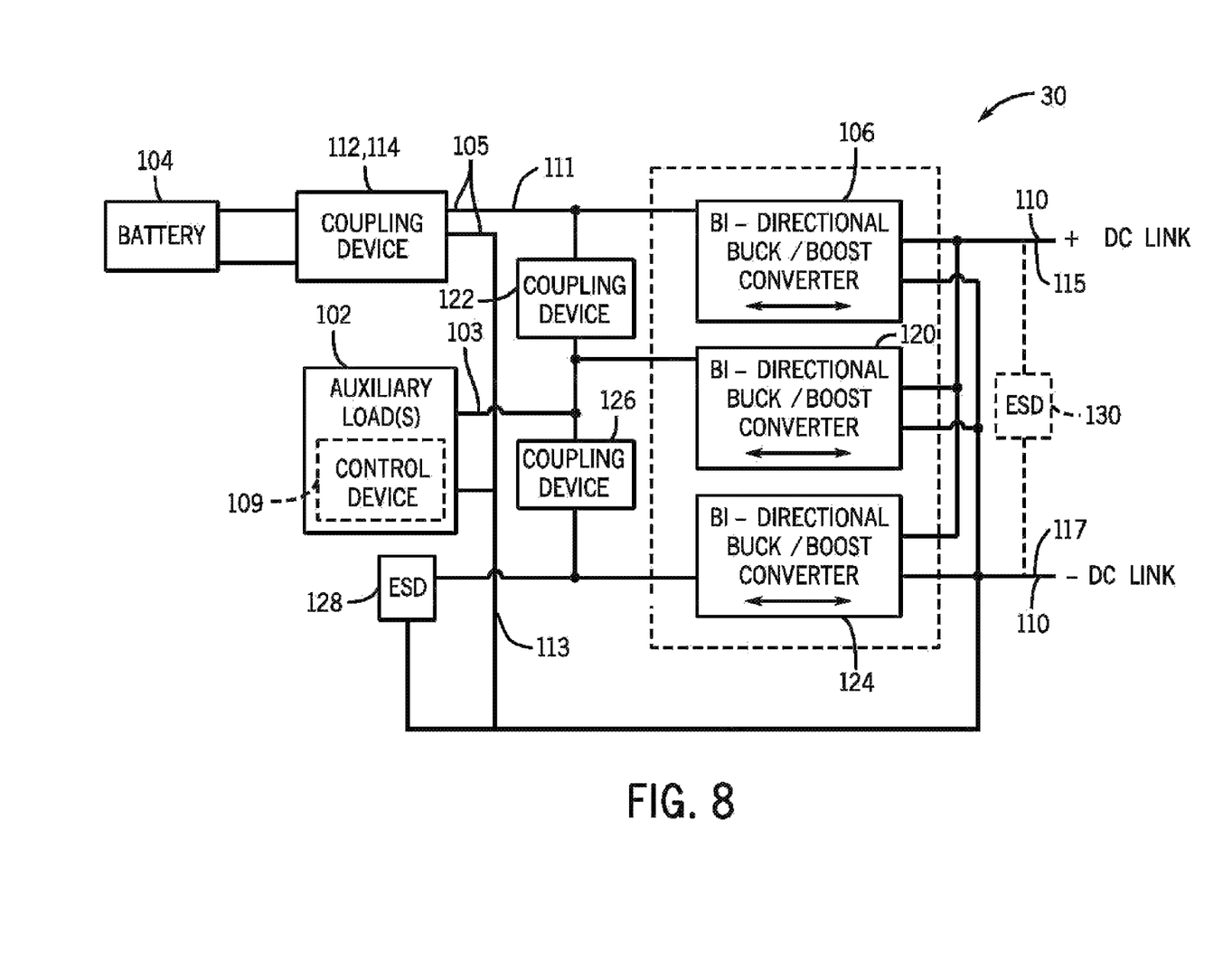
FIG. 8 is a schematic diagram of an auxiliary drive circuit according to an embodiment of the invention.

The auxiliary drive circuit 30 illustrated in FIGS. 7 and 8 is based on the circuit 20 shown in FIGS. 5 and 6 and adds a third bi-directional buck/boost converter 124, a second coupling device 126, and a second energy storage device 128. Third bi-directional buck/boost converter 124, which is configured to be controlled by EMS 116, is coupled between second DC bus 110 and second energy storage device 128. Second energy storage device 128 can be charged directly from battery 104 through coupling devices 122, 126 or from second DC bus 110 through third bi-directional buck/boost converter 124. The second DC bus 110 voltage (high-voltage side) is determined by the voltage from first bi-directional buck/boost converter 106 and, depending on the state of coupling device 122, possibly from the second bi-directional buck/boost converter 120, or associated traction drive(s) (not shown) or other loads/sources (not shown) that may be attached to the high-voltage side of second DC link 110. Second energy storage device 128, which may be one of a battery and an ultracapacitor, can also supply power to second DC bus 110 through third bi-directional buck/boost converter 124, or to auxiliary load 102 through second and third bi-directional buck/boost converters 120 and 124.

Still referring to FIGS. 7 and 8, a third energy storage device 130 (shown in phantom) may be coupled across second DC bus 110. Third energy storage device 130, which may be one of a battery and an ultracapacitor, can supply power directly to second DC bus 110, to battery 104 through first bi-directional buck/boost converter 106, to auxiliary load 102 through second bi-directional buck/boost converter 120, or to energy storage device 128 through third bi-directional buck/boost converter 124.

Figure 9:
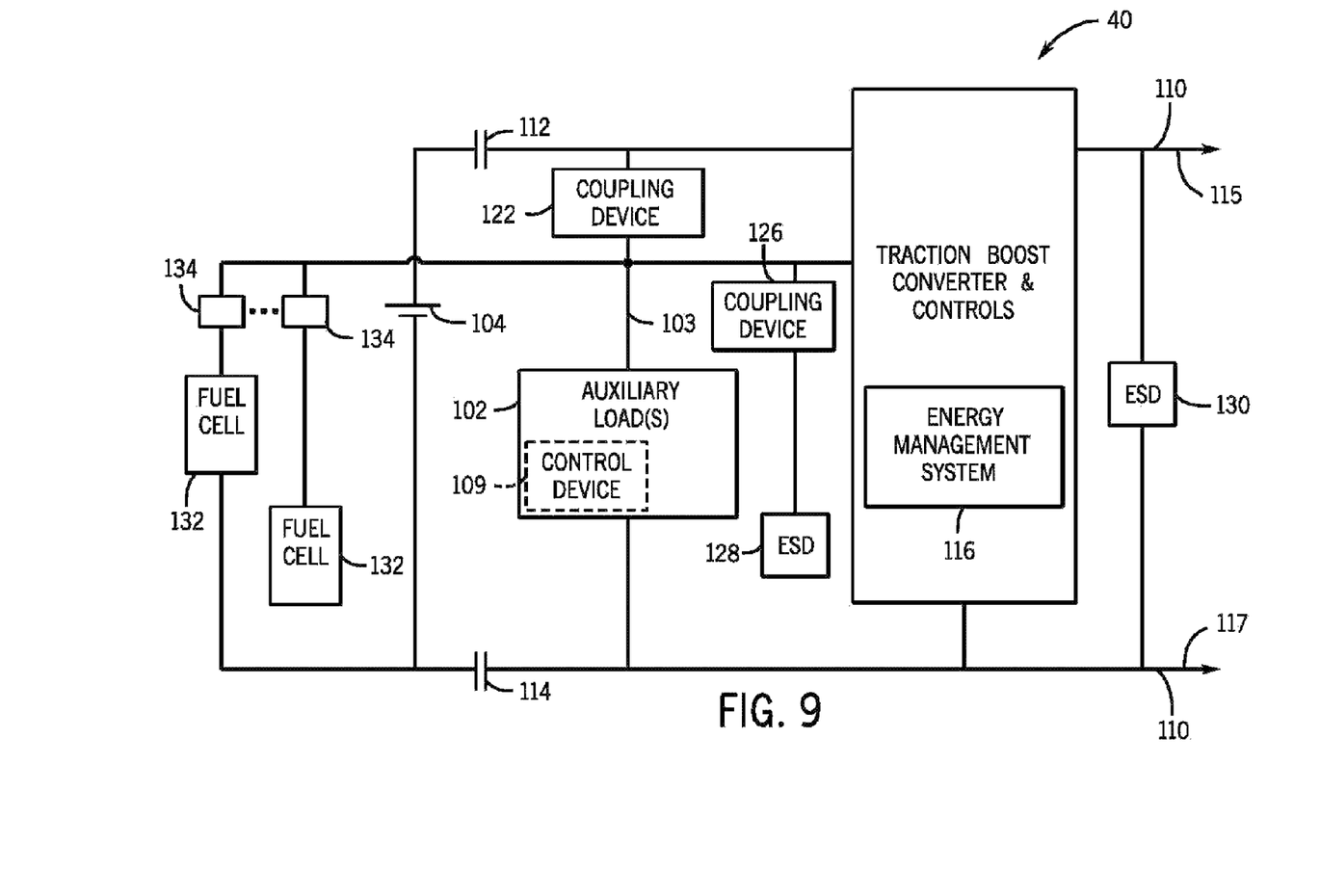
FIG. 9 is a schematic diagram of an auxiliary drive circuit according to an embodiment of the invention.
Figure 10:
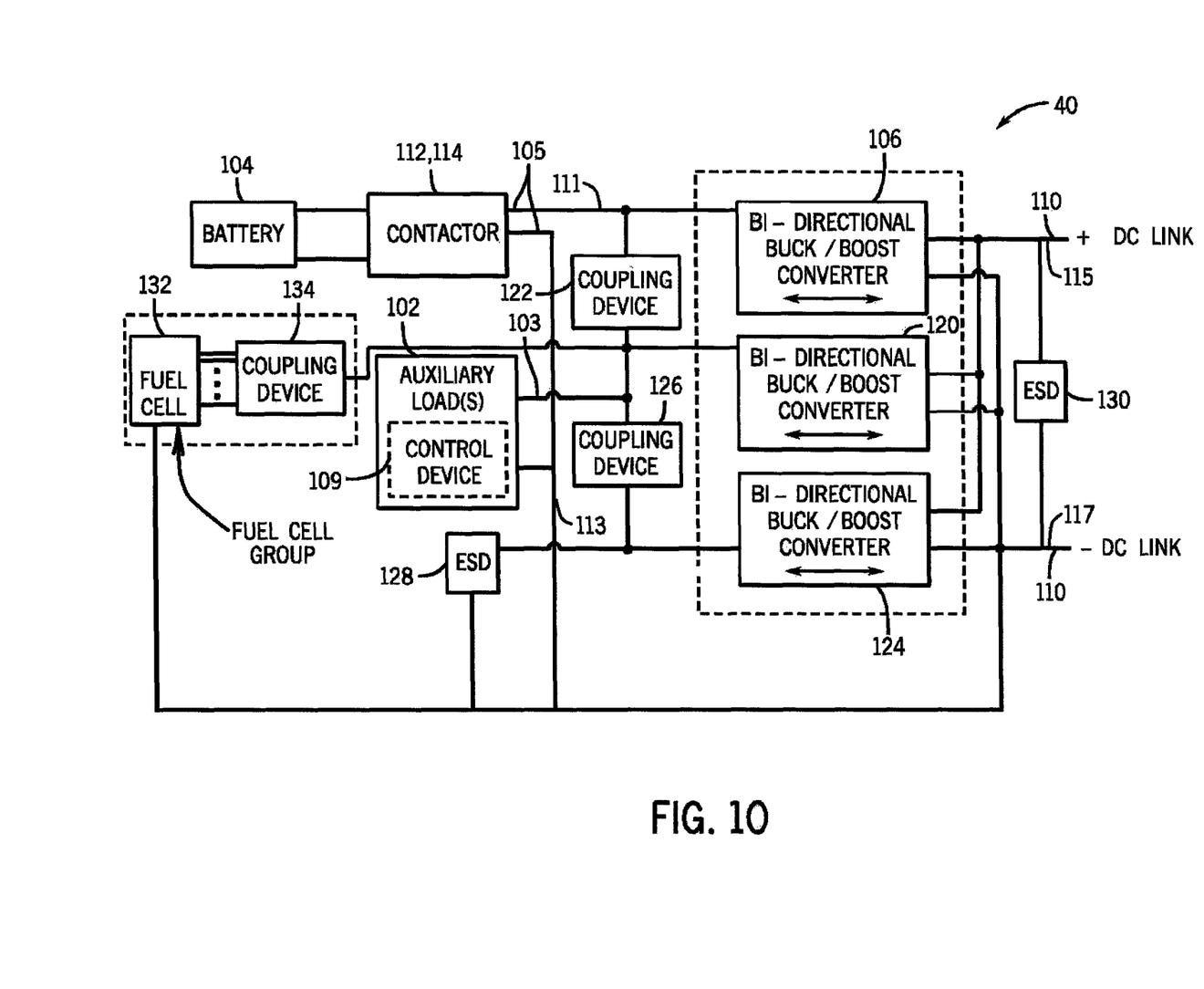
FIG. 10 is a schematic diagram of an auxiliary drive circuit according to an embodiment of the invention.

FIGS. 9 and 10 illustrate an auxiliary drive circuit 40 based on circuit 30 shown in FIGS. 7 and 8 and includes a plurality of fuel cells 132 and a plurality of coupling devices 134, each of which may be one of a diode, a contactor and a semiconductor switch. The plurality of fuels cells 132, each of which is coupled to a separate coupling device 134, are configured to supply electrical power directly to auxiliary system 102, to second DC bus 110 through second bi-directional buck/boost converter 120, to battery 104 either through first bi-directional buck/boost converter 106, or possibly to second energy storage device 128 through coupling device 126 or through third bi-directional buck/boost converter 124.

Figure 11:
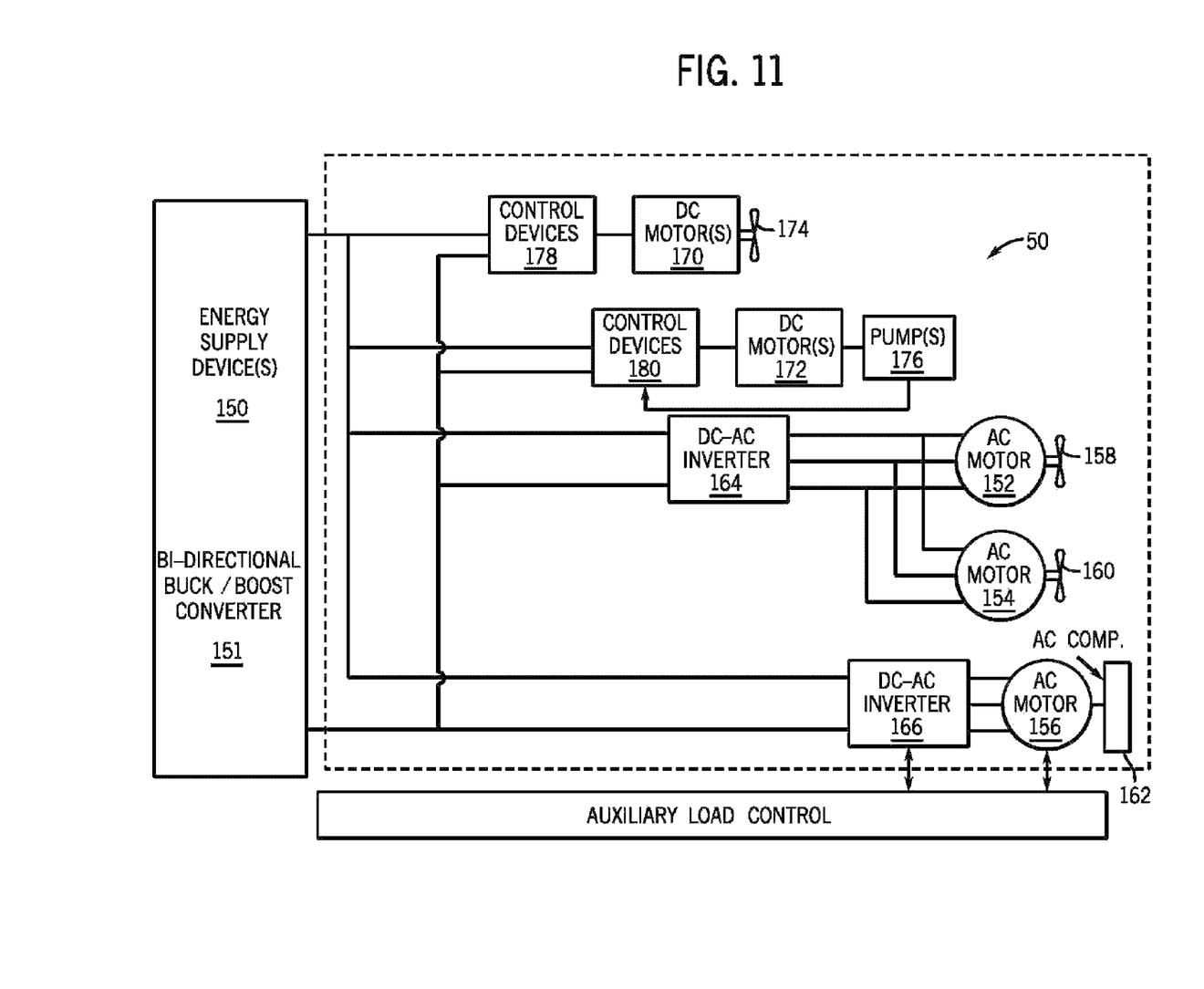
FIG. 11 is a schematic diagram of an auxiliary drive circuit having multiple auxiliary loads according to an embodiment of the invention.

FIG. 11 illustrates an example of an auxiliary drive system 50 having multiple auxiliary loads, which receive electrical power from one or more energy supply devices 150 through a bi-directional buck/boost converter 151. The multiple auxiliary loads include three AC motors 152, 154 and 156. AC motors 152 and 154 drive fans 158 and 160, respectively. AC motor 156 drives an air conditioning compressor 162. AC power is supplied to motors 152, 154 and 156 via two DC-to-AC inverters 164, 166. System 50 also includes two DC motors 170, 172. DC motor 170 drives a fan 174 while DC motor 172 drives a pump 176. DC power is supplied to motors 170, 172 via control devices 178, 180, which may include one of a DC-to-DC converter, a thermo-switch, a flow sensor, and a pressure switch. As explained above, the DC voltage to the multiple auxiliary systems may be controlled by bi-directional buck/boost converter 151. Additionally, control devices 178, 180 and DC-to-AC inverters 164, 166 may be configured to independently control the voltage input to their respective auxiliary loads. For example, if the vehicle or system is operating at low power levels, the DC motors 170, 172, which run the fan 174 and pump 176, are likewise operating at very low speeds. Applying a relatively low voltage input from converter 151 to control devices 178, 180 will allow operation of control devices 178, 180 and motors 170, 172 at a higher efficiency level than if the control devices 178, 180 and motors 170, 172 were operated directly from battery 104, which is at a relatively high voltage.

According to one embodiment of the invention, an auxiliary drive circuit including a first energy storage device coupled to a first DC bus and configured to output electrical power to the first DC bus, and a first DC-to-DC voltage converter coupled to the first DC bus and to a second DC bus, the first DC-to-DC voltage converter configured to convert the electrical power to a first voltage and to output the first voltage to the second DC bus. The auxiliary drive circuit also includes a second DC-to-DC voltage converter coupled to the second DC bus and coupled to an auxiliary bus, the second DC-to-DC voltage converter configured to convert the first voltage to a second voltage and to provide the second voltage to the auxiliary bus, the auxiliary bus configured to provide an auxiliary voltage to an auxiliary load, wherein the second voltage is different from the first voltage.

In accordance with another embodiment of the invention, a method of manufacturing includes coupling a first energy storage device to a first DC link, the first energy device configured to output electrical power to the first DC link, coupling a first switch-mode power supply to the first DC link and to a second DC link, and configuring the first switch-mode power supply to convert the electrical power output by the first energy storage device to the first DC link into a first voltage, and to output the first voltage to the second DC link. The method also includes coupling a second switch-mode power supply to the second DC link and to an auxiliary bus, and configuring the second switch-mode power supply to convert the first voltage to a second voltage and to supply the second voltage to the auxiliary bus, wherein the second voltage is different from the first voltage.

In accordance with yet another embodiment of the invention, an auxiliary drive system including a first energy storage device coupled to a first DC bus, the first energy storage device configured to output electrical power to the first DC bus, a first bi-directional buck/boost converter coupled to a second DC bus and to the first DC bus, the first bi-directional buck/boost converter configured to output a first voltage to the second DC bus, a voltage converter coupled between an auxiliary bus and the second DC bus, the voltage converter configured to convert the first voltage to a second voltage different from the first voltage, the second voltage output to the auxiliary bus. The auxiliary drive system further includes an auxiliary system coupled to the auxiliary bus, and configured to receive an input voltage from the auxiliary bus, and a controller configured to regulate the first voltage output from the first bi-directional buck/boost converter, and further configured to regulate the second voltage output from the voltage converter.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An auxiliary drive circuit comprising:
   a first energy storage device electrically coupled to a first DC bus;
   a first switch-mode power supply coupled between the first DC bus and a second DC bus, the first switch-mode power supply configured to step up a voltage of the first energy storage device to a first voltage and provide the first voltage to the second DC bus, where the first voltage is higher than the voltage of the first energy storage device;
   a second switch-mode power supply coupled between the second DC bus and an auxiliary bus, the second switch-mode power supply configured to step down the first voltage to a second voltage and provide the second voltage to the auxiliary bus, where the second voltage is lower than the first voltage;
   a voltage converter coupled between the auxiliary bus and an auxiliary load, the voltage converter configured to receive the stepped down second voltage and adjust the second voltage so as to provide a controlled voltage input to the auxiliary load, and
   a controller in operable communication with the first and second switch-mode power supplies and with the voltage converter, the controller being configured to:
      receive an input comprising a measured value of one or more parameters associated with operation of a vehicle in which the auxiliary drive circuit is incorporated;
      provide a command to the voltage converter regarding the controlled voltage at which to operate the auxiliary load; and
      based on the measured value of the one or more parameters, selectively control the first and second switch-mode power supplies to control the second voltage provided to the voltage converter.

2. The auxiliary drive circuit of claim 1 wherein the auxiliary load comprises a DC motor; and
   wherein the voltage converter comprises a DC-to-DC converter.

3. The auxiliary drive circuit of claim 1 further comprising a second energy storage device coupled to the auxiliary bus and to the second switch-mode power supply; and
   wherein the second switch-mode power supply is further configured to convert a voltage of the second energy storage device to a third voltage and to provide the third voltage to the second DC bus, the third voltage different from the voltage of the second energy storage device.

4. The auxiliary drive circuit of claim 3 further comprising a coupling device coupled between the second energy storage device and the second switch-mode power supply.

5. The auxiliary drive circuit of claim 1 further comprising a coupling device coupled between the first energy storage device and the first switch-mode power supply, wherein the coupling device comprises one of a contactor, a semiconductor switch, and a diode.

6. The auxiliary drive circuit of claim 5 wherein the coupling device comprises a set of contactors configured to de-couple positive and negative terminals of the first energy storage device from the remainder of the auxiliary drive circuit.

7. The auxiliary drive circuit of claim 1 wherein the second switch-mode power supply comprises a buck converter.

8. The auxiliary drive circuit of claim 1 wherein the first switch-mode power supply comprises a first bi-directional buck/boost converter.

9. The auxiliary drive circuit of claim 8 further comprising a coupling device coupled between the auxiliary bus and the first DC bus; and
   wherein the second switch-mode power supply comprises a second bi-directional buck/boost converter.

10. The auxiliary drive circuit of claim 9 further comprising:
    a second energy storage device; and
    a third bi-directional buck/boost converter coupled between the second DC bus and the second energy storage device.

11. The auxiliary drive circuit of claim 10 wherein the second energy storage device comprises one of a battery and an ultracapacitor.

12. The auxiliary drive circuit of claim 1 further comprising a second energy storage device coupled to the second DC bus and configured to store energy from, and supply energy to, the first and second switch-mode power supplies; and
    wherein the second energy storage device comprises one of a battery and an ultracapacitor.

13. The auxiliary drive circuit of claim 1 wherein the controller is further configured to control an output voltage of at least one of the first and the second switch-mode power supplies to the auxiliary load using pulse-width-modulation to optimize an operating efficiency of the auxiliary load.

14. The auxiliary drive circuit of claim 1 wherein the one or more parameters associated with operation of a vehicle in which the auxiliary drive circuit is incorporated comprise at least one of ambient temperature, coolant temperature, traction drive power and torque levels, vehicle speed, vehicle acceleration/deceleration rate, vehicle operating mode, and road gradient.

15. A method of manufacturing comprising:
    coupling a first energy storage device to a first DC link;

coupling a first switch-mode power supply to the first DC link and to a second DC link, the first switch-mode power configured to convert a voltage output by the first energy storage device to the first DC link into a first voltage, and output the first voltage to the second DC link;

coupling a second switch-mode power supply to the second DC link and to an auxiliary bus, the second switch-mode power supply configured to convert the first voltage to a second voltage, different from the first voltage and to supply the second voltage to the auxiliary bus;

providing one of a DC-to-DC converter and an DC-to-AC inverter between the auxiliary bus and each of one or more auxiliary loads coupled to the auxiliary bus, the one of the DC-to-DC converter and the DC-to-AC inverter independently adjusting the second voltage received from the auxiliary bus to a level suitable for its respective auxiliary load, and coupling a controller to the first and second switch-mode power supplies and to each of the DC-to-DC converter and the DC-to-AC inverter provided between the auxiliary bus and a respective auxiliary load of the one or more auxiliary loads, the controller configured to dynamically set the second voltage on the auxiliary bus based on one or more parameters associated with operation of a vehicle on which the one or more auxiliary loads are incorporated.

16. The method of claim 15 wherein the controller is further configured to:
receive an input comprising a measured value of the one or more parameters associated with operation of the vehicle on which the one or more auxiliary loads are incorporated; and
generate and transmit a command to the respective one of the DC-to-DC converter and the DC-to-AC inverter regarding the controlled voltage at which to operate each of the one or more auxiliary loads.

17. The method of claim 15 further comprising:
providing a second energy storage device, the second energy device comprising one of a battery and a fuel cell;
coupling the second energy storage device to the auxiliary bus; and
coupling the second energy storage device to the second DC link via the second switch-mode power supply.

18. The method of claim 17 further comprising coupling a first coupling device between the second energy storage device and the second switch-mode power supply.

19. The method of claim 18 further comprising coupling a second coupling device between the first DC link and the auxiliary bus; and
wherein the first and second coupling devices comprise one of semiconductor switches, diodes, and contactors.

20. The method of claim 15 wherein the first switch-mode power supply comprises a first bi-directional buck/boost converter.

21. The method of claim 20 wherein the second switch-mode power supply comprises a second bi-directional buck/boost converter.

22. An auxiliary drive system comprising:
a first energy storage device coupled to a first DC bus;
a first switch-mode power supply coupled to a second DC bus and to the first DC bus, the first switch-mode power supply configured to modify a voltage of the first DC bus and output the modified voltage to the second DC bus;
a second switch-mode power supply coupled between an auxiliary bus and the second DC bus, the second switch-mode power supply configured to convert the modified voltage of the second DC bus to an auxiliary bus voltage different from the modified voltage and output the auxiliary bus voltage to the auxiliary bus;
a first control device coupled between the auxiliary bus and a first auxiliary load, the first control device comprising one of a DC-to-DC converter and a DC-to-AC inverter configured to control a voltage provided to the first auxiliary load from the auxiliary bus; and
a controller configured to regulate operation of the first switch-mode power supply and the second switch-mode power supply using pulse-width modulation;
wherein, in regulating operation of the first switch-mode power supply and the second switch-mode power supply, the controller is configured to:
receive an input comprising a measured value of one or more parameters associated with operation of a vehicle in which the auxiliary drive circuit is incorporated;
provide a command to the first control device regarding the controlled voltage at which to operate the auxiliary load; and
based on the measured value of the one or more parameters, control operation of the first and second switch-mode power supplies to provide the auxiliary bus voltage to the first control device at a desired level; and
wherein the first switch-mode power supply, the second switch-mode power supply, and the first control device provide a three-stage voltage conversion by which a voltage is provided to the first auxiliary load.

23. The auxiliary drive system of claim 22 further comprising a controller configured to regulate operation of the first switch-mode power supply and the second switch-mode power supply using pulse-width modulation.

24. The auxiliary drive system of claim 22 further comprising a second control device coupled between the auxiliary bus and a second auxiliary load, the second control device configured to decouple the second auxiliary load from the auxiliary bus voltage; and
wherein the second auxiliary load is configured to operate a voltage different from an operating voltage of the first auxiliary load.

25. The auxiliary drive system of claim 22 further comprising a coupling device positioned between the first DC bus and the auxiliary bus and configured to selectively couple the first DC bus to the auxiliary bus.

26. The auxiliary drive system of claim 22 further comprising:
a second energy storage device configured to supply electrical power to the auxiliary bus; and
a third switch-mode power supply coupled to the second energy storage device and to the second DC bus, the third switch-mode power supply configured to modify a voltage of the second DC bus and output the modified voltage to charge the second energy storage device.

27. The auxiliary drive system of claim 26 further comprising a coupling device electrically coupling the second energy storage device to the auxiliary bus.

* * * * *